(12) United States Patent
Schrempp et al.

(10) Patent No.: US 10,025,841 B2
(45) Date of Patent: *Jul. 17, 2018

(54) PLAY LIST GENERATION METHOD AND APPARATUS

(71) Applicant: Audible Magic Corporation, Los Gatos, CA (US)

(72) Inventors: James B. Schrempp, Saratoga, CA (US); Vance Ikezoye, Los Gatos, CA (US); Erling H. Wold, El Cerrito, CA (US); Thomas L. Blum, San Francisco, CA (US); Douglas F. Keislar, Berkeley, CA (US); James A. Wheaton, Sebastopol, CA (US)

(73) Assignee: Audible Magic, Inc., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/610,983

(22) Filed: Jan. 30, 2015

(65) Prior Publication Data

US 2015/0154273 A1 Jun. 4, 2015

Related U.S. Application Data

(63) Continuation of application No. 09/910,680, filed on Jul. 20, 2001, now Pat. No. 8,972,481.

(51) Int. Cl.
*G06F 15/16* (2006.01)
*G06F 17/30* (2006.01)
(Continued)

(52) U.S. Cl.
CPC .. *G06F 17/30575* (2013.01); *G06F 17/30743* (2013.01); *G10L 15/26* (2013.01);
(Continued)

(58) Field of Classification Search
CPC .......... H04N 7/16; H04L 67/16; H04L 69/329
See application file for complete search history.

(56) References Cited

U.S. PATENT DOCUMENTS 2,539,767 A 1/1951 Anderson
3,919,479 A 11/1975 Moon et al.
(Continued)

FOREIGN PATENT DOCUMENTS

EP 0349106 1/1990
EP 0402210 6/1990
(Continued)

OTHER PUBLICATIONS

Albert, Douglas, et al., "Combatting Software Piracy by encryption and key management," IEEE Computer Society, vol. 17. No. 4, Apr. 1984, 6 pages.
(Continued)

*Primary Examiner* — Dhairya A Patel
(74) *Attorney, Agent, or Firm* — Lowenstein Sandler LLP

(57) ABSTRACT

A method and system for playlist generation is disclosed. In one aspect, the system may include at least one analysis module for receiving and analyzing an unknown work and generating a corresponding representation thereof, and at least one identification (ID) server for receiving the representation from the analysis modules and determining the identity of the unknown work.

17 Claims, 5 Drawing Sheets

(51) Int. Cl.
*H04N 7/16* (2011.01)
*H04N 21/254* (2011.01)
*H04L 29/08* (2006.01)
*G10L 15/26* (2006.01)

(52) U.S. Cl.
CPC ............ *G10L 15/265* (2013.01); *H04L 67/16* (2013.01); *H04N 7/16* (2013.01); *H04N 21/254* (2013.01); *H04L 69/329* (2013.01)

(56) References Cited

U.S. PATENT DOCUMENTS

| | | | |
|---|---|---|---|
| 4,230,990 A * | 10/1980 | Lert, Jr. | G06K 9/00711 348/473 |
| 4,449,249 A | 5/1984 | Price | |
| 4,450,531 A | 5/1984 | Kenyon | |
| 4,454,594 A | 6/1984 | Hefron et al. | |
| 4,623,837 A | 11/1986 | Efron et al. | |
| 4,677,455 A | 6/1987 | Okajima | |
| 4,677,466 A * | 6/1987 | Lert, Jr. | G06K 9/00711 348/E7.024 |
| 4,739,398 A | 4/1988 | Thomas et al. | |
| 4,843,562 A * | 6/1989 | Kenyon | G06K 9/00523 702/73 |
| 4,918,730 A | 4/1990 | Schulze | |
| 5,210,820 A * | 5/1993 | Kenyon | G06K 9/00496 704/200 |
| 5,247,688 A | 9/1993 | Ishigami | |
| 5,283,819 A | 2/1994 | Glick | |
| 5,327,521 A | 7/1994 | Savic et al. | |
| 5,437,050 A | 7/1995 | Lamb et al. | |
| 5,442,645 A | 8/1995 | Ugon | |
| 5,504,518 A | 4/1996 | Ellis | |
| 5,581,658 A | 12/1996 | O'Hagan et al. | |
| 5,588,119 A | 12/1996 | Vincent | |
| 5,612,974 A | 3/1997 | Astrachan | |
| 5,613,004 A | 3/1997 | Cooperman et al. | |
| 5,612,729 A | 5/1997 | Ellis et al. | |
| 5,638,443 A | 6/1997 | Stefik | |
| 5,692,213 A | 11/1997 | Goldberg et al. | |
| 5,701,452 A | 12/1997 | Siefert | |
| 5,710,916 A | 1/1998 | Barbara et al. | |
| 5,758,257 A | 2/1998 | Herz et al. | |
| 5,724,605 A | 3/1998 | Wissner | |
| 5,732,193 A | 3/1998 | Aberson | |
| 5,790,691 A | 8/1998 | Narayanswamy et al. | |
| 5,850,388 A | 12/1998 | Anderson | |
| 5,862,260 A | 1/1999 | Rhoads | |
| 5,881,182 A | 3/1999 | Fiete et al. | |
| 5,918,223 A | 6/1999 | Blum et al. | |
| 5,924,071 A | 7/1999 | Morgan et al. | |
| 5,930,369 A | 7/1999 | Cox et al. | |
| 5,930,749 A | 7/1999 | Maes | |
| 5,943,422 A | 8/1999 | Van Wie et al. | |
| 5,949,885 A | 9/1999 | Leighton | |
| 5,959,659 A | 9/1999 | Dokic | |
| 5,983,176 A | 11/1999 | Hoffert et al. | |
| 6,006,183 A | 12/1999 | Lai et al. | |
| 6,006,256 A | 12/1999 | Zdepski et al. | |
| 6,011,758 A | 1/2000 | Dockes | |
| 6,012,051 A | 1/2000 | Sammon et al. | |
| 6,026,411 A | 2/2000 | Delp | |
| 6,026,439 A | 2/2000 | Chowdhury | |
| 6,044,402 A | 3/2000 | Jacobson | |
| 6,067,369 A | 5/2000 | Kamei | |
| 6,067,517 A | 5/2000 | Bahl et al. | |
| 6,088,455 A | 7/2000 | Logan et al. | |
| 6,092,040 A | 7/2000 | Voran | |
| 6,096,961 A | 8/2000 | Bruti | |
| 6,118,450 A | 9/2000 | Proehl et al. | |
| 6,192,340 B1 | 2/2001 | Abecassis | |
| 6,195,693 B1 | 2/2001 | Berry | |
| 6,229,922 B1 | 5/2001 | Sasakawa et al. | |
| 6,243,615 B1 | 6/2001 | Neway | |
| 6,243,725 B1 | 6/2001 | Hempleman et al. | |
| 6,253,193 B1 | 6/2001 | Ginter | |
| 6,253,337 B1 | 6/2001 | Maloney et al. | |
| 6,279,010 B1 | 8/2001 | Anderson | |
| 6,279,124 B1 * | 8/2001 | Brouwer | G06F 11/263 714/38.11 |
| 6,285,596 B1 | 9/2001 | Miura et al. | |
| 6,330,593 B1 | 12/2001 | Roberts et al. | |
| 6,345,256 B1 | 2/2002 | Milsted et al. | |
| 6,345,274 B1 | 2/2002 | Zhu et al. | |
| 6,360,265 B1 | 3/2002 | Falck et al. | |
| 6,363,381 B1 | 3/2002 | Lee et al. | |
| 6,370,513 B1 | 4/2002 | Kolawa et al. | |
| 6,374,260 B1 | 4/2002 | Hoffert et al. | |
| 6,385,596 B1 | 5/2002 | Wiser | |
| 6,418,421 B1 | 7/2002 | Hurtado et al. | |
| 6,422,061 B1 | 7/2002 | Sunshine | |
| 6,425,081 B1 | 7/2002 | Iwamura | |
| 6,434,520 B1 | 8/2002 | Kanevsky et al. | |
| 6,438,556 B1 | 8/2002 | Malik et al. | |
| 6,449,226 B1 | 9/2002 | Kumagai | |
| 6,452,874 B1 | 9/2002 | Otsuka et al. | |
| 6,453,252 B1 | 9/2002 | Laroche | |
| 6,460,050 B1 | 10/2002 | Pace et al. | |
| 6,463,508 B1 | 10/2002 | Wolf et al. | |
| 6,477,704 B1 | 11/2002 | Cremia | |
| 6,487,641 B1 | 11/2002 | Cusson et al. | |
| 6,490,279 B1 | 12/2002 | Chen et al. | |
| 6,496,802 B1 | 12/2002 | van Zoest et al. | |
| 6,526,411 B1 | 2/2003 | Ward | |
| 6,542,869 B1 | 4/2003 | Foote | |
| 6,550,001 B1 | 4/2003 | Corwin et al. | |
| 6,550,011 B1 | 4/2003 | Sims, III | |
| 6,552,254 B2 | 4/2003 | Hasegawa et al. | |
| 6,570,991 B1 | 5/2003 | Scheirer et al. | |
| 6,591,245 B1 | 7/2003 | Klug | |
| 6,609,093 B1 | 8/2003 | Gopinath et al. | |
| 6,609,105 B2 | 8/2003 | van Zoest et al. | |
| 6,628,737 B1 | 9/2003 | Timus | |
| 6,636,965 B1 | 10/2003 | Beyda | |
| 6,654,757 B1 | 11/2003 | Stern | |
| 6,675,174 B1 | 1/2004 | Bolle et al. | |
| 6,690,835 B1 | 2/2004 | Brockmeyer et al. | |
| 6,714,921 B2 | 3/2004 | Stefik et al. | |
| 6,732,180 B1 | 5/2004 | Hale | |
| 6,735,699 B1 | 5/2004 | Sasaki et al. | |
| 6,763,069 B1 | 7/2004 | Divakaran et al. | |
| 6,771,316 B1 | 8/2004 | Iggulden | |
| 6,771,885 B1 | 8/2004 | Agnihotri et al. | |
| 6,788,800 B1 | 9/2004 | Carr et al. | |
| 6,834,308 B1 | 12/2004 | Ikezoye et al. | |
| 6,868,440 B1 * | 3/2005 | Gupta | G06F 17/30017 348/E7.071 |
| 6,947,909 B1 | 9/2005 | Hoke, Jr. | |
| 6,968,337 B2 | 11/2005 | Wold | |
| 6,990,453 B2 | 1/2006 | Wang et al. | |
| 7,043,536 B1 | 5/2006 | Philyaw | |
| 7,047,241 B1 | 5/2006 | Erickson et al. | |
| 7,058,223 B2 | 6/2006 | Cox et al. | |
| 7,181,398 B2 | 2/2007 | Thong et al. | |
| 7,194,752 B1 | 3/2007 | Kenyon et al. | |
| 7,228,293 B2 | 6/2007 | DeTreville | |
| 7,263,205 B2 | 8/2007 | Lev | |
| 7,266,645 B2 | 9/2007 | Garg et al. | |
| 7,269,556 B2 | 9/2007 | Kiss et al. | |
| 7,281,272 B1 | 10/2007 | Rubin et al. | |
| 7,289,643 B2 | 10/2007 | Brunk et al. | |
| 7,349,552 B2 | 3/2008 | Levy et al. | |
| 7,363,278 B2 | 4/2008 | Schmelzer et al. | |
| 7,424,747 B2 | 9/2008 | DeTreville | |
| 7,426,750 B2 | 9/2008 | Cooper et al. | |
| 7,443,797 B2 | 10/2008 | Cheung et al. | |
| 7,474,759 B2 | 1/2009 | Sternberg et al. | |
| 7,500,007 B2 | 3/2009 | Ikezoye et al. | |
| 7,529,659 B2 | 5/2009 | Wold | |
| 7,546,120 B1 | 6/2009 | Ulvenes et al. | |
| 7,562,012 B1 | 7/2009 | Wold | |
| 7,565,327 B2 | 7/2009 | Schmelzer | |
| 7,593,576 B2 | 9/2009 | Meyer et al. | |
| 7,613,686 B2 | 11/2009 | Rui | |

(56) References Cited

U.S. PATENT DOCUMENTS

| | | | |
|---|---|---|---|
| 7,630,562 | B2 | 12/2009 | Gong et al. |
| 7,653,210 | B2 | 1/2010 | Rhoads |
| 7,701,941 | B2 | 4/2010 | O'Callaghan et al. |
| 7,707,088 | B2 | 4/2010 | Schmelzer et al. |
| 7,711,652 | B2 | 5/2010 | Schmelzer et al. |
| 7,770,013 | B2 | 8/2010 | Rhoads et al. |
| 7,797,249 | B2 | 9/2010 | Schmelzer et al. |
| 7,853,664 | B1 | 12/2010 | Wang et al. |
| 7,877,438 | B2 | 1/2011 | Schrempp et al. |
| 7,917,645 | B2 | 3/2011 | Ikezoye et al. |
| 8,006,314 | B2 | 8/2011 | Wold |
| 8,082,150 | B2 | 12/2011 | Wold |
| 8,086,445 | B2 | 12/2011 | Wold |
| 8,112,818 | B2 | 2/2012 | Wold |
| 8,122,339 | B2 | 2/2012 | Bastos Dos Santos et al. |
| 8,130,746 | B2 | 3/2012 | Schrempp et al. |
| 8,199,651 | B1 | 6/2012 | Schrempp et al. |
| 8,316,238 | B2 | 11/2012 | Mergen et al. |
| 8,332,326 | B2 | 12/2012 | Schrempp et al. |
| 8,458,156 | B1 | 6/2013 | Sharifi et al. |
| 8,472,669 | B2 | 6/2013 | Sharma |
| 8,484,691 | B2 | 7/2013 | Schmelzer et al. |
| 8,645,279 | B2 | 2/2014 | Schmelzer |
| 8,732,858 | B2 | 5/2014 | Wold |
| 8,775,317 | B2 | 7/2014 | Schmelzer |
| 8,843,952 | B2 | 9/2014 | Pora et al. |
| 8,886,635 | B2 | 11/2014 | Cho et al. |
| 8,972,481 | B2 | 3/2015 | Schrempp et al. |
| 2001/0013061 | A1 | 8/2001 | DeMartin |
| 2001/0027493 | A1 | 10/2001 | Wallace |
| 2001/0027522 | A1 | 10/2001 | Saito |
| 2001/0034219 | A1 | 10/2001 | Hewitt et al. |
| 2001/0037304 | A1 | 11/2001 | Paiz |
| 2001/0041989 | A1 | 11/2001 | Vilcauskas et al. |
| 2001/0051996 | A1 | 12/2001 | Cooper et al. |
| 2001/0056430 | A1 | 12/2001 | Yankowki |
| 2002/0002899 | A1 | 1/2002 | Gjerdingen et al. |
| 2002/0019858 | A1* | 2/2002 | Kaiser ............... G06F 17/30029 709/219 |
| 2002/0023220 | A1 | 2/2002 | Kaplan |
| 2002/0037083 | A1 | 3/2002 | Weare et al. |
| 2002/0042754 | A1* | 4/2002 | Del Beccaro ......... G06Q 30/02 705/26.35 |
| 2002/0049760 | A1 | 4/2002 | Scott |
| 2002/0064149 | A1 | 5/2002 | Elliott et al. |
| 2002/0069098 | A1 | 6/2002 | Schmidt |
| 2002/0073316 | A1 | 6/2002 | Collins et al. |
| 2002/0082999 | A1 | 6/2002 | Lee |
| 2002/0083060 | A1 | 6/2002 | Wang et al. |
| 2002/0087885 | A1 | 7/2002 | Peled et al. |
| 2002/0120577 | A1 | 8/2002 | Hans et al. |
| 2002/0123990 | A1 | 9/2002 | Abe et al. |
| 2002/0129140 | A1 | 9/2002 | Peled et al. |
| 2002/0133494 | A1 | 9/2002 | Goedken |
| 2002/0133499 | A1 | 9/2002 | Ward et al. |
| 2002/0141384 | A1 | 10/2002 | Liu et al. |
| 2002/0152261 | A1 | 10/2002 | Arkin et al. |
| 2002/0152262 | A1 | 10/2002 | Arkin et al. |
| 2002/0156737 | A1 | 10/2002 | Kahn |
| 2002/0157005 | A1 | 10/2002 | Brunk et al. |
| 2002/0158737 | A1 | 10/2002 | Yokoyama |
| 2002/0178410 | A1 | 11/2002 | Haitsma et al. |
| 2002/0184517 | A1 | 12/2002 | Tadayon et al. |
| 2002/0186887 | A1 | 12/2002 | Rhoads |
| 2002/0198789 | A1 | 12/2002 | Waldman |
| 2003/0014530 | A1 | 1/2003 | Bodin |
| 2003/0018709 | A1 | 1/2003 | Schrempp et al. |
| 2003/0023852 | A1 | 1/2003 | Wold |
| 2003/0033321 | A1 | 2/2003 | Schrempp et al. |
| 2003/0037010 | A1 | 2/2003 | Schmelzer et al. |
| 2003/0061352 | A1 | 3/2003 | Bohrer |
| 2003/0061490 | A1 | 3/2003 | Abajian |
| 2003/0051100 | A1 | 5/2003 | Patel |
| 2003/0095660 | A1 | 5/2003 | Lee et al. |
| 2003/0105739 | A1 | 6/2003 | Essafi et al. |
| 2003/0135623 | A1 | 7/2003 | Schrempp et al. |
| 2003/0191719 | A1 | 10/2003 | Ginter et al. |
| 2003/0191764 | A1 | 10/2003 | Richards |
| 2003/0195852 | A1 | 10/2003 | Campbell et al. |
| 2003/0223554 | A1* | 12/2003 | Zhang ................... G06Q 99/00 379/93.12 |
| 2004/0008864 | A1 | 1/2004 | Watson et al. |
| 2004/0010495 | A1 | 1/2004 | Kramer et al. |
| 2004/0028281 | A1 | 2/2004 | Cheng et al. |
| 2004/0053654 | A1 | 3/2004 | Kokumai et al. |
| 2004/0073513 | A1 | 4/2004 | Stefik et al. |
| 2004/0089142 | A1 | 5/2004 | Georges et al. |
| 2004/0133797 | A1 | 7/2004 | Arnold |
| 2004/0148191 | A1 | 7/2004 | Hoke, Jr. |
| 2004/0163106 | A1 | 8/2004 | Schrempp et al. |
| 2004/0167858 | A1 | 8/2004 | Erickson |
| 2004/0199387 | A1 | 10/2004 | Wang et al. |
| 2004/0201784 | A9 | 10/2004 | Dagtas et al. |
| 2005/0021783 | A1 | 1/2005 | Ishii |
| 2005/0038819 | A1 | 2/2005 | Hicken et al. |
| 2005/0039000 | A1 | 2/2005 | Erickson |
| 2005/0044189 | A1 | 2/2005 | Ikezoye et al. |
| 2005/0097059 | A1 | 5/2005 | Shuster |
| 2005/0141707 | A1 | 6/2005 | Haitsma et al. |
| 2005/0154678 | A1 | 7/2005 | Schmelzer |
| 2005/0154680 | A1 | 7/2005 | Schmelzer |
| 2005/0154681 | A1 | 7/2005 | Schmelzer |
| 2005/0216433 | A1 | 9/2005 | Bland et al. |
| 2005/0267945 | A1 | 12/2005 | Cohen et al. |
| 2005/0289065 | A1 | 12/2005 | Weare |
| 2006/0034177 | A1 | 2/2006 | Schrempp |
| 2006/0062426 | A1 | 3/2006 | Levy et al. |
| 2007/0033409 | A1 | 2/2007 | Brunk et al. |
| 2007/0074147 | A1 | 3/2007 | Wold |
| 2007/0078769 | A1 | 4/2007 | Way et al. |
| 2007/0186229 | A1 | 8/2007 | Conklin et al. |
| 2007/0226365 | A1 | 9/2007 | Hildreth et al. |
| 2007/0271248 | A1 | 11/2007 | Albernoz et al. |
| 2008/0008173 | A1 | 1/2008 | Kanevsky et al. |
| 2008/0019371 | A1 | 1/2008 | Anschutz et al. |
| 2008/0133415 | A1 | 6/2008 | Ginter et al. |
| 2008/0141379 | A1 | 6/2008 | Schmelzer |
| 2008/0154730 | A1 | 6/2008 | Schmelzer |
| 2008/0155116 | A1 | 6/2008 | Schmelzer |
| 2008/0250080 | A1 | 10/2008 | Arrasvuori et al. |
| 2009/0030651 | A1 | 1/2009 | Wold |
| 2009/0031326 | A1 | 1/2009 | Wold |
| 2009/0043870 | A1 | 2/2009 | Ikezoye et al. |
| 2009/0077673 | A1 | 3/2009 | Schmelzer |
| 2009/0089586 | A1 | 4/2009 | Brunk |
| 2009/0131152 | A1 | 5/2009 | Busse |
| 2009/0132391 | A1 | 5/2009 | Jacobs |
| 2009/0192640 | A1 | 7/2009 | Wold |
| 2009/0240361 | A1 | 9/2009 | Wold et al. |
| 2009/0306966 | A1 | 12/2009 | Hejna, Jr. |
| 2009/0328236 | A1 | 12/2009 | Schmelzer |
| 2010/0042843 | A1 | 2/2010 | Brunk |
| 2010/0104259 | A1 | 4/2010 | Shakya et al. |
| 2010/0281042 | A1 | 11/2010 | Windes et al. |
| 2010/0290667 | A1 | 11/2010 | Lienhart et al. |
| 2010/0290867 | A1 | 11/2010 | Leinhart et al. |
| 2011/0066489 | A1 | 3/2011 | Gharaat et al. |
| 2011/0078719 | A1 | 3/2011 | Kenyon et al. |
| 2011/0119149 | A1 | 5/2011 | Ikezoye et al. |
| 2012/0124679 | A1 | 5/2012 | Wold |
| 2012/0318071 | A1 | 12/2012 | Biehl et al. |
| 2013/0011008 | A1 | 1/2013 | Ikezoye et al. |
| 2013/0159021 | A1 | 6/2013 | Felsher |
| 2013/0318071 | A1 | 11/2013 | Cho et al. |

FOREIGN PATENT DOCUMENTS

| | | |
|---|---|---|
| EP | 0517405 | 5/1992 |
| EP | 0689316 | 12/1995 |
| EP | 0731446 | 9/1996 |
| EP | 0859503 | 8/1998 |
| EP | 0459046 | 4/1999 |
| EP | 1354276 | 12/2007 |
| EP | 1485815 | 10/2009 |

(56) References Cited

FOREIGN PATENT DOCUMENTS

| | | |
|---|---|---|
| EP | 177191 | 2/2012 |
| EP | 1449103 | 3/2012 |
| EP | 1492767 | 6/2014 |
| GB | 2464049 | 12/2012 |
| WO | WO 96/36163 | 11/1996 |
| WO | WO 98/20672 | 5/1998 |
| WO | WO 00/05650 | 2/2000 |
| WO | WO 00/39954 | 7/2000 |
| WO | WO 00/63800 | 10/2000 |
| WO | WO 01/23981 | 4/2001 |
| WO | WO 01/47179 | 6/2001 |
| WO | WO 01/52540 | 7/2001 |
| WO | WO 2001/062004 | 8/2001 |
| WO | WO 02/03203 | 1/2002 |
| WO | WO 02/15035 | 2/2002 |
| WO | WO 2002/027600 | 4/2002 |
| WO | WO 02/037316 | 5/2002 |
| WO | WO 02/082271 | 10/2002 |
| WO | WO 02/086803 | 10/2002 |
| WO | WO 03/009149 | 1/2003 |
| WO | WO 03/036496 | 5/2003 |
| WO | WO 03/067459 | 8/2003 |
| WO | WO 03/091990 | 11/2003 |
| WO | WO 04/044820 | 5/2004 |
| WO | WO 2003/007235 | 7/2004 |
| WO | WO 04/070558 | 8/2004 |
| WO | WO 06/015168 | 2/2006 |
| WO | WO 09/017710 | 2/2009 |

OTHER PUBLICATIONS

Audible Magic Corporation, "Audio Identification Technology Provides The Cornerstone for Online Distribution," 2000, http://www.audiblemagic.com/documents/Technology_Summary.pdf.
Baum, L., et al., "A Maximization Technique Occurring in the Statistical Analysis of Probabilistic Functions of Markov Chains," *The Annals of Mathematical Statistics*, vol. 41, No. 1, pp. 164-171, 1970.
Beritelli, F., et al., "Multilayer Chaotic Encryption for Secure Communications in packet switching Networks," IEEE, vol. 2Aug. 2000, pp. 1575-1582.
Blum, T., Keislar, D., Wheaton, J., and Wold, E., "Audio Databases with Content-Based Retrieval," Proceedings of the 1995 International Joint Conference on Artificial Intelligence (IJCAI) Workshop on Intelligent Multimedia Information Retrieval, 1995.
Breslin, Pat, et al., Relatable Website, "Emusic uses Relatable's open source audio recognition solution, TRM, to signature its music catabblog for MusicBrainz database," http://www.relatable.com/news/pressrelease/001017.release.html, Oct. 17, 2000.
Business Wire, "Cisco and Fox Host Groundbreaking Screening of Titan A.E.; Animated Epic Will Be First Film Ever to be Digitaly Transmitted Over the Internet Monday," Jun. 5, 2000, 08:14 EDT.
Business Wire, "IBM: IBM Announces New Descrambler Software; First to Offer Software to Work With Digital Video Chips," Jun. 5, 25, 1997, 07:49.
Chen, et al., Yong-Cong, A Secure and Robust Digital Watermaking Technique by the Blcok Cipher RC6 and Secure Hash Algorithm, Department of Computer Science, National Tsing Hua University, 2001.
Cosi, P., De Poli, G., Prandoni, P., "Timbre Characterization with Mel-Cepstrum and Neural Nets," Proceedings of the 1994 International Computer Music Conference, pp. 42-45, San Francisco, No date.
Dempster, A.P., et al., "Maximum Likelihood from Incomplete Data via the EM Algorithm" *Journal of the Royal Statistical Society, Series B (Methodological)*, vol. 39, Issue 1, pp. 31-38, 1977.
Feiten, B. and Gunzel, S., "Automatic Indexing of a Sound Database Using Self-Organizing Neural Nets," Computer Music Journal, 18:3, pp. 53-65, Fall 1994.
Fischer, S., Lienhart, R., and Effelsberg, W., "Automatic Recognition of Film Genres," Reihe Informatik, Jun. 1995, Universitat Mannheim, Praktische Informatik IV, L15, 16, D-68131 Mannheim.
Foote, J., "A Similarity Measure for Automatic Audio Classification," Institute of Systems Science, National University of Singapore, 1977, Singapore.
Gasaway Laura, Close of Century Sees New Copyright Amendments, Mar. 200, Information Outlook, 4, 3, 42.
Gonzalez, R. and Melih, K., "Content Based Retrieval of Audio," The Institute for Telecommunication Research, University of Wollongong, Australia. ATNAC '96 Proceedings.
Haitsma, J., et al., "Robust Audio Hashing for Content Identification", CBMI 2001, Second International Workshop on Content Based Multimedia and Indexing, Brescia, Italy, Sep. 19-21, 2001.
Harris, Lesley Ellen, "To register or not," Mar. 2006, Information Outlook, 10, 3, 32(s).
Kanth, K.V. et al. "Dimensionality Reduction or Similarity Searching in Databases," Computer Vision and Image understanding, vol. 75, Nos. 1/2 Jul./Aug. 1999, pp. 59-72, Academic Press. Santa Barbara, CA, USA.
Keislar, D., Blum, T., Wheaton, J., and Wold, E., "Audio Analysis for Content-Based Retrieval" Proceedings of the 1995 International Computer Music Conference.
Lin, et al., "Generating Robust Digital Signature for Image/Video Authentication," Proc. Multimedia and Security workshop at ACM Multimedia'98, Sep. 1, 1998, pp. 49-54.
Ohtsuki, K., et al., "Topic extraction based on continuous speech recognition in broadcast-news speech," Proceedings IEEE Workshop on Automated Speech Recognition and Understanding, 1997, pp. 527-534, N.Y., N.Y., USA.
PacketHound Tech Specs, www.palisdesys.com/products/packethount/tck specs/prod Phtechspecs.shtml, 2002.
"How does PacketHound work?" www.palisdesys.com/products/packethound/how_does_it_work/prod_Pghhow.shtml 2002.
Pankanti, Sharath, "Verification Watermarks on Fingerprint Recognition and Retrieval," Part of IS&T/SPIE Conference on Security and Watermarking of Multimedia Contents, San Jose, CA Jan. 1999, SPIE vol. 3657, pp. 66-78.
Pellom, B. et al., "Fast Likelihood Computation Techniques in Nearest-Neighbor search for Continuous Speech Recognition.", *IEEE Signal Processing Letters*, vol. 8, pp. 221-224 Aug. 2001.
Reynolds, D., et al., "Robust Text-Independent Speaker Identification Using Gaussian Mixture Speaker Models", *IEEE Transactions on Speech and Audio Processing*, vol. 3, No. 1, pp. 72-83 Jan. 1995.
Scheirer, E., Slaney, M., "Construction and Evaluation of a Robust Multifeature Speech/Music Discriminator," pp. 1-4, Proceedings of ICASSP-97, Apr. 2-24, Munich, Germany.
Scheirer, E.D., "Tempo and Beat Analysis of Acoustic Musical Signals," Machine Listening Group, E15-401D MIT Media Laboratory, pp. 1-21, Aug. 8, 1997, Cambridge, MA.
Schneier, Bruce, Applied Cryptography, Protocols, Algorithms and Source Code in C, Chapter 2 Protocol Building Blocks, 1996, pp. 30-31.
Smith, Alan J., "Cache Memories," Computer Surveys, Sep. 1982, University of California, Berkeley, California, vol. 14, No. 3, pp. 1-61.
Vertegaal, R. and Bonis, E., "ISEE: An Intuitive Sound Editing Environment," Computer Music Journal, 18:2, pp. 21-22, Summer 1994.
Wang, Yao, et al., "Multimedia Content Analysis," IEEE Signal Processing Magazine, pp. 12-36, Nov. 2000, IEEE Service Center, Piscataway, N.J., USA.
Wold, Erling, et al., "Content Based Classification, Search and Retrieval of Audio," IEEE Multimedia, vol. 3, No. 3, pp. 27-36, 1996 IEEE Service Center, Piscataway, N.J., USA.
Zawodny, Jeremy, D., "A C Program to Compute CDDB discids on Linus and FreeBSD," [internet] http://jeremy.zawodny.com/c/discid-linux-1.3tar.gz, 1 page, Apr. 14, 2001, retrieved Jul. 17, 2007.
European Patent Application No. 02752347.1, Supplementary European Search Report dated May 8, 2006, 4 pages.
European Patent Application No. 02756525.8, Supplementary European Search Report dated Jun. 28, 2006, 4 pages.

(56) References Cited

OTHER PUBLICATIONS

European Patent Application No. 02782170, Supplementary European Search Report dated Feb. 7, 2007, 4 pages.
European Patent Application No. 02725522.3, Supplementary European Search Report dated May 12, 2006, 2 Pages.
European Patent Application No. 04706547.9 European Search Report dated Feb. 25, 2010, 3 Pages.
European Patent Application No. 05778109.8 European Search Report dated Sep. 10, 2010, 7 Pages.
PCT Search Report PCT/US01/50295, International Search Report dated May 14, 2003, 5 Pages.
PCT Search Report PCT/US02/10615, International Search Report dated Aug. 7, 2002, 5 Pages.
PCT Search Report PCT/US02/33186, International Search Report dated Dec. 16, 2002, 6 Pages.
PCT Search Report PCT/US04/02748, International Search Report and Written Opinion dated Aug. 20, 2007, 8 Pages.
PCT Search Report PCT/US05/26887, International Search Report dated May 3, 2006, 3 Pages.
PCT Search Report PCT/US08/09127, International Search Report dated Oct. 30, 2008, 8 Pages.
International Search Report & Written Opinion dated Apr. 15, 2014, for PCT/US2013/061750.
Kunio Kashino et al, "Robust Search Methods for Music Signals Based on Simple Representation", 2007 IEEE International Conference on Acoustics, Speech, and Signal Processing Apr. 15-20, 2007 Honolulu, HI, USA, Piscataway, NJ, USA, (Oct. 23, 2007), doi:10.1109/ICASSP.2007.367346, ISBN 978-1-4244-0727-9, pp. IV-1421.
Jaap Haitsma et al, "A Highly Robust Audio Fingerprinting System With an Efficient Search Strategy", Journal of New Music Research, Lisse, doi:10.1076/jnmr.32.2.211.16746, (Oct. 17, 2002), pp. 211-221, URL: http://www.cs.northwestern.edu/~pardo/courses/casa2009/casa_papers_2009/papers/audio fingerprint - haitsma.pdf, (Mar. 18, 2016).
Cong Jin et al, "Applications of digital fingerprinting and digital watermarking for E-commerce security mechanism", Audio, Language and Image Processing, 2008. ICALIP 2008. International Conference on, IEEE, Piscataway, NJ, USA, (Jul. 7, 2008), ISBN 978-1-4244-1723-0, pp. 536-540.
Ron White, How Computers Work, Oct. 15, 2003, Que Publishing, 7th Ed., p. 4.
European Patent Application No. 13840744.0 extended European Search Report dated Sep. 5, 2016, 9 pages.

\* cited by examiner

PLAY LIST GENERATION METHOD AND APPARATUS

RELATED APPLICATIONS

This application is a continuation application of pending U.S. patent application Ser. No. 09/910,680 filed on Jul. 20, 2001, which is incorporated by reference herein.

FIELD OF THE DISCLOSURE

The present disclosure relates to data communications, and, in particular, to a novel system and apparatus for the automatic generation of media playlists.

BACKGROUND

One application of the Internet that has received considerable attention is the ability to transmit or stream media content over the Internet. Once an audio or video work has been digitally encoded it may be both downloaded by users for play, or broadcast ("streamed") over the Internet. When works are streamed, they may be listened to or viewed by Internet users in a manner much like traditional radio and television stations.

Given the widespread use of digital media, audio works, or video works may need to be identified. The need for identification of works may arise in a variety of situations. For example, an artist may wish to verify royalty payments or generate their own Arbitron®-like ratings by identifying how often their works are being streamed or downloaded. Thus, play lists of media may need to be generated. The prior art has made efforts to create methods for identifying digital works and generating playlists.

As is known by those skilled in the art, a playlist is the documentation of the performance of one or more works at a particular time over a particular media.

FIG. 1 shows a play list generation system 100 of the prior art. The system 100 may include one or more remote detection modules 102 deployed at various locations throughout a broadcast area. Each detection module 102 may include an antenna 104 for receiving broadcast signals and providing the signals to an analysis and lookup module 106. The module 106 is typically configured to identify the content of the received signal by comparing its audio content against a database 108 of known reference signatures.

If a match is made, typically the module 102 will keep a record of all matches made during a predetermined period of time on the database 108. For example, the module 102 may keep a record of song titles detected during a 24-hour period.

The system 100 may further include a playlist server 110 having a processor 112 and database 114. The server 110 is typically configured to receive information such as the titles of identified songs from the one or more detection modules 102 through a network such as the Internet 109 and generate a playlist which may be stored on database 114.

The system 100 of the prior art in operation typically requires the identity of an unknown work to be determined by the individual detection modules. The playlist server 110 is typically only configured to receive and compile identities of works from the modules 102 into a play list.

SUMMARY

A playlist generation system is disclosed in embodiments. In one aspect, the system may include at least one analysis module for receiving and analyzing an unknown work and generating a corresponding representation thereof, and at least one identification (ID) server for receiving the representation from the at least one analysis modules and determining the identity of the unknown work.

The system may receive unknown works from networked sources or broadcast sources, or directly from the source prior to the work being provided to a network or broadcast source. The analysis modules and ID servers may be coupled over a network, such as the Internet.

The representations and identification may be based upon feature vectors, a spectral representation of the unknown work, the text output of a speech recognition system, musical score produced by a music transcription system, or a bit calculated key method, such as MDS hash, as are known in the art.

The system analysis modules may receive a plurality of streaming sources for analysis at a single location, or from a plurality of streaming sources for analysis at a plurality of access points of the network.

The system provides representations in approximately real time, and the system may generate a playlist of identified works. The ID server may generate a playlist of identified works received from different access points of the network in approximately real time.

Various methods for generating a playlist are also disclosed.

DETAILED DESCRIPTION

Persons of ordinary skill in the art will realize that the following description is illustrative only and not in any way limiting. Other modifications and improvements will readily suggest themselves to such skilled persons having the benefit of this disclosure.

This disclosure may relate to data communications. Various disclosed aspects may be embodied in various computer and machine readable data structures. Furthermore, it is contemplated that data structures embodying the teachings of the disclosure may be transmitted across computer and machine readable media, and through communications systems by use of standard protocols such as those used to enable the Internet and other computer networking standards.

The disclosure may relate to machine readable media on which are stored various aspects of the disclosure. It is contemplated that any media suitable for retrieving instructions is within the scope of the present disclosure. By way of example, such media may take the form of magnetic, optical, or semiconductor media.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein. Accordingly, the representation of various aspects of the present disclosure through the use of flowcharts should not be used to limit the scope of the present disclosure.

Exemplary Structure

Figure 1:
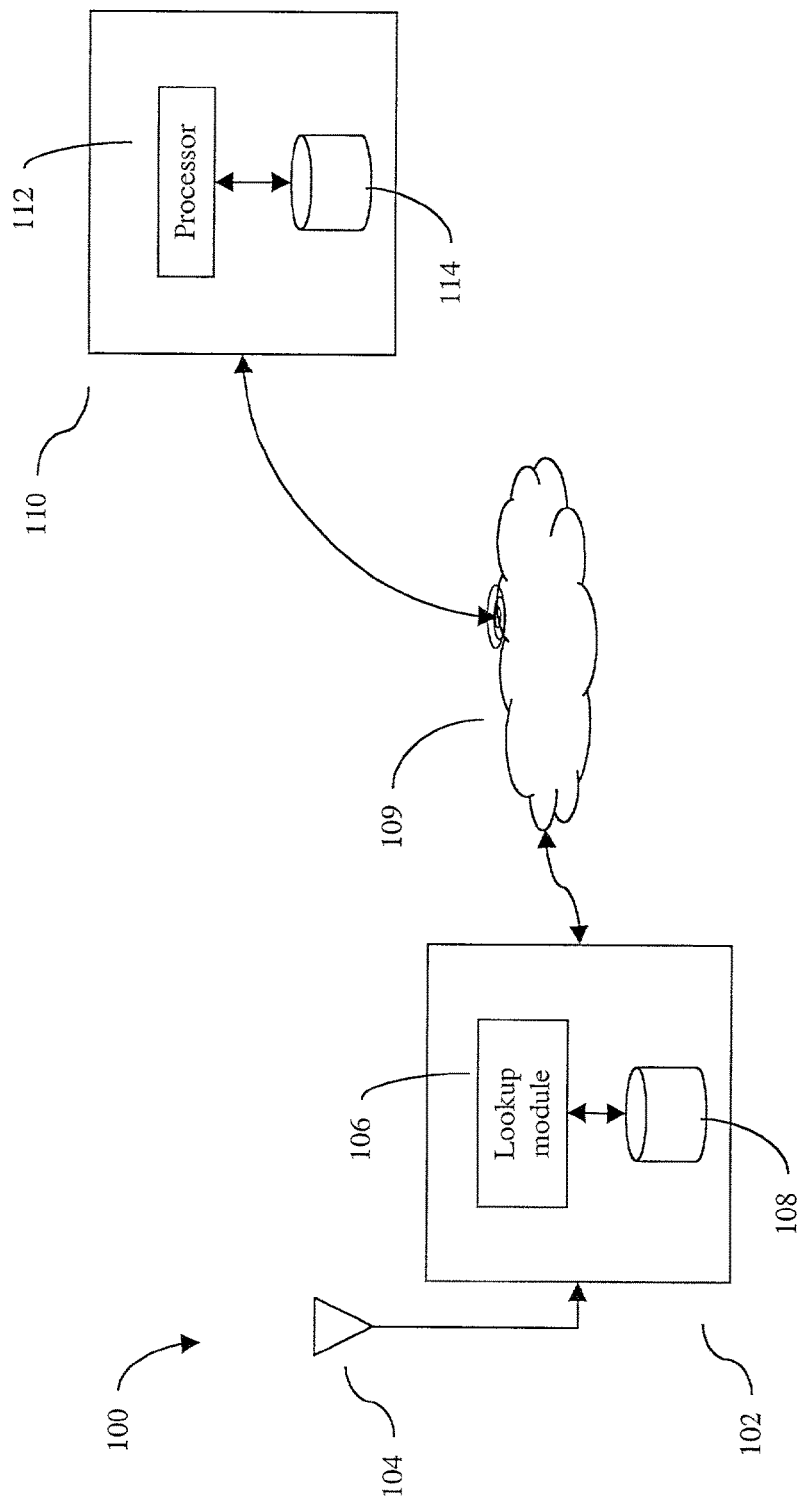
FIG. 1 is a prior art diagram of a system.
Figure 2:
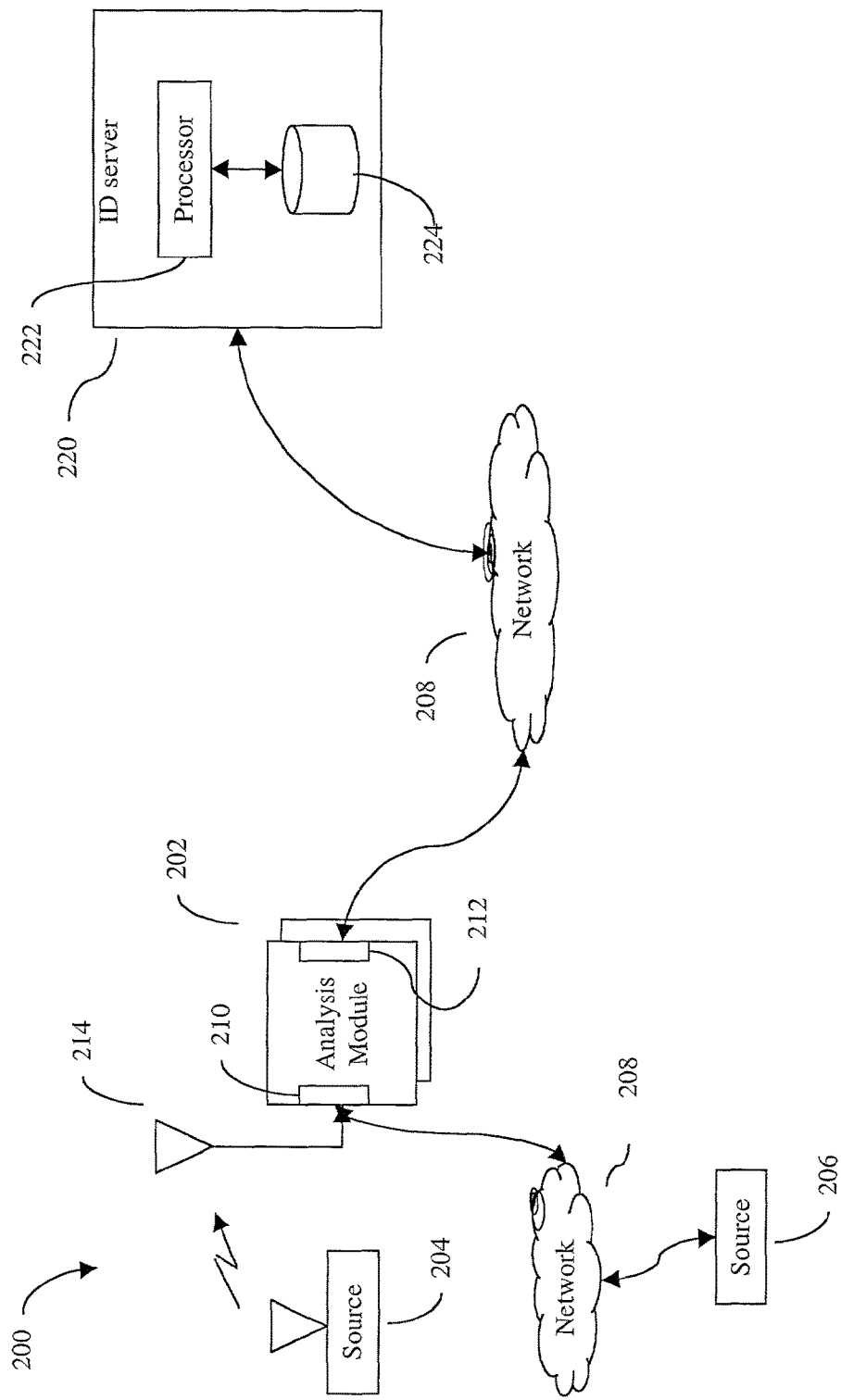
FIG. 2 is a block diagram of one aspect of a disclosed system including one or more analysis modules and ID servers.

FIG. 2 is a schematic diagram of one aspect of a disclosed play list generation system 200. The system 200 may include at least one analysis module 202 for receiving an unknown work from a broadcast source 204 as is known in the art. The analysis module may include one or more conventional antennae 214 coupled to the analysis module 202 through an input port 210. The input port 210 may include a conventional receiver for the reception of desired broadcast signals. The input port 210 may also be configured to provide remote control functionality for allowing the remote control and configuration of the receiver, such as providing for remote tuning. The input port 210 may be further configured to digitize received signals in digital formats using protocols known in the art, such as PCM.

The analysis module 202 may also be configured to receive an unknown work from one or more networked sources 206. In one aspect of a disclosed system, the input port 210 of the analysis module 202 may be configured to monitor sources providing content in standard formats such as Real®, 5 QuickTime®, Windows Media®, MP3®, and similar formats, using hardware and software as is known in the art.

In another aspect of a disclosed system, the input port 210 may be configured to directly receive audio or video through any of the various means know in the art, such as a microphone or video acquisition system. These unknown works may also be provided in standard formats such as MP3, Windows Media, and similar formats. Thus, the analysis module 202 may be configured to receive an unknown work prior to the unknown work being presented to the broadcast system or network source. It is envisioned that this presentation could occur almost simultaneously.

The input port 210 may be operatively coupled to a network 208 through which the source 206 may be accessed. The network 208 may comprise any packet- or frame-based network known in the art, such as the Internet. The input port 210 may also be configured to access the network 208 through any means known in the art, such as through traditional copper connections. Furthermore, the input port 210 may also be configured to access the network 208 using wireless connectivity methods as known in the art, including low-power broadband methods such as Bluetooth®, or cellular-based access methods such as those used to provide wireless connectivity to cellular phones and personal digital assistants (PDAs).

The analysis module 202 may also include an output port 212 for providing connectivity to the network 208. The output port 212 may comprise a separate unit within the analysis module 202 and may include hardware and software to provide the same functionality as the input port 210. Additionally, it is contemplated that the output port 212 may comprise substantially the same circuitry as the input port 210 in order to save space and cost.

Figure 3:
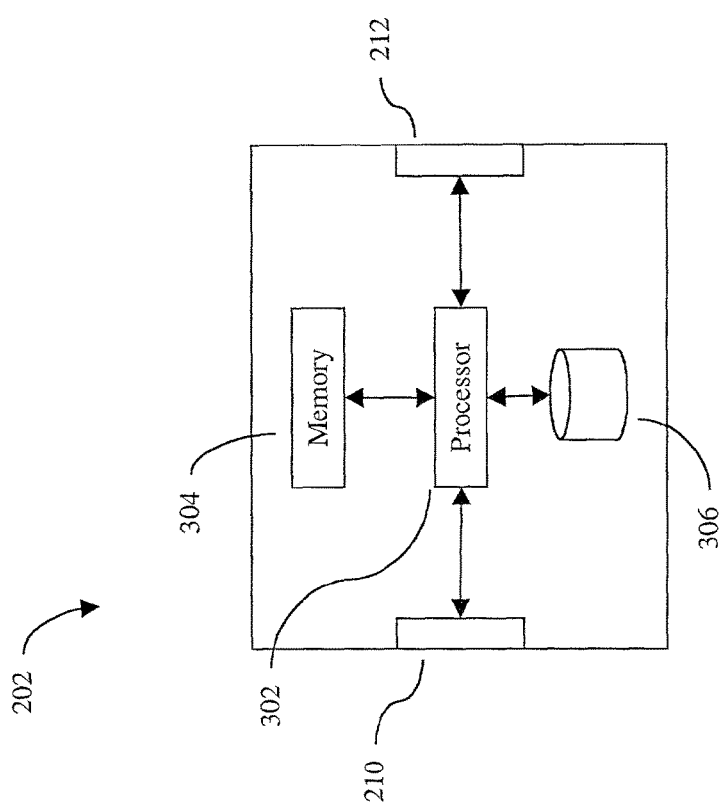
FIG. 3 is a block diagram of one aspect of an analysis module.

Referring now to FIG. 3, a conceptual block diagram of one aspect of a disclosed analysis module 202 is shown. The analysis module 202 may include a processor 302 for operating various aspects of the present disclosure. The processor 302 may be operatively disposed between the input port 210 and output port 212.

It is contemplated that any processor known in the art may be employed in the module 202, and the choice of a processor may depend on the application. For example, if the module 202 is embodied in a personal computer, the processor 202 may comprise a microprocessor capable of running conventional operating systems such as Microsoft Windows®, while if the module 202 is deployed in a mobile unit such as a PDA, the processor 202 may need only be capable of running an operating system such as Palm OS®, or other embedded systems such as may be present in a cell phone or other consumer device.

The module 202 may include ancillary hardware and software, such as conventional memory 304 and a conventional database 306 for the storage and retrieval of various aspects of the disclosed system and data.

The module 202 may be configured to generate a representation of an unknown work which may then be used by the system to identify the unknown work. It is contemplated that a wide variety of methods may be used by the analysis module 202 to generate the representation. The analysis module may be configured to generate a representation of the unknown work using the psychoacoustic properties of the audio content of the unknown work. Such methods are known in the art. For example, the analysis module may generate feature vectors as disclosed in U.S. Pat. No. 5,918,223 to Blum, et al., which is assigned to the same assignee of the present disclosure and incorporated by reference as though fully set forth herein.

Additionally, the module 202 may use audio or video spectral or wavelet representation techniques as are known in the art. For example, other representation forms may comprise the text output of a speech recognition system, text output of a close captioned transmission, or a musical score produced by a music transcription system. In another embodiment, the representation may comprise a bit calculated key using any of the techniques as are known in the art such as MD5 hash and CRC. It is contemplated that a wide variety of analysis methods may be employed singly or in combination advantageously in the present disclosure.

Referring back to FIG. 2, the system 200 may further include at least one identification (ID) server 220 for identifying an unknown work. The ID server 220 may identify an unknown work using a representation received from the analysis module 202 through network 208. Though FIG. 2 shows the ID server 220 coupled to the same network 208 as the analysis module 202, it is to be understood that the various components of the present disclosure may be coupled to different networks at different times.

The ID server 220 may comprise a computer suitable for running an operating system such as Microsoft Windows®, UNIX®, LINUX®, MAC OS®, and the like. The ID server 220 may include a conventional processor 222 for operation of the server. The ID server may further include associated hardware and software known in the art such as a conventional database 224 for storing embodiments of the disclosure or data.

It is contemplated that the ID server 220 may be configured to identify the unknown work using a variety of methods known in the art. The method for identification may correspond to the method(s) used to generate the representation within the analysis module. For example, the ID server 220 may be configured to perform identification using the methods disclosed in U.S. Pat. No. 5,918,223 to Blum, et al, if the representation were generated using corresponding methods.

Another example would be the pure spectral representations as are known in the art. It is envisioned that other representations such as wavelets may be used. The invention could also identify the unknown work from the speech recognized text compared against a database of song lyrics using any of a variety of methods known to those skilled in the art.

Yet another example would be any of a number of search techniques as are known in the art when the representation is a bit calculated key.

The system may also identify the unknown work by searching a collection of musical works for musical note sequences that correspond to the musical score the representation.

In another configuration the system may use a combination of identification techniques, each of which correspond to a representation of the unknown work. By using several identification techniques, the chance of a misidentification may be greatly reduced.

Though the analysis module and ID server are shown as being located separately, it is contemplated that they also may be co-located in a single server. For example, it is contemplated that the analysis module and ID server may each be embodied in a single board computer wherein the analysis module and ID server are housed in a single unit and operatively coupled through a common backplane.

Exemplary Operation

Figure 4:
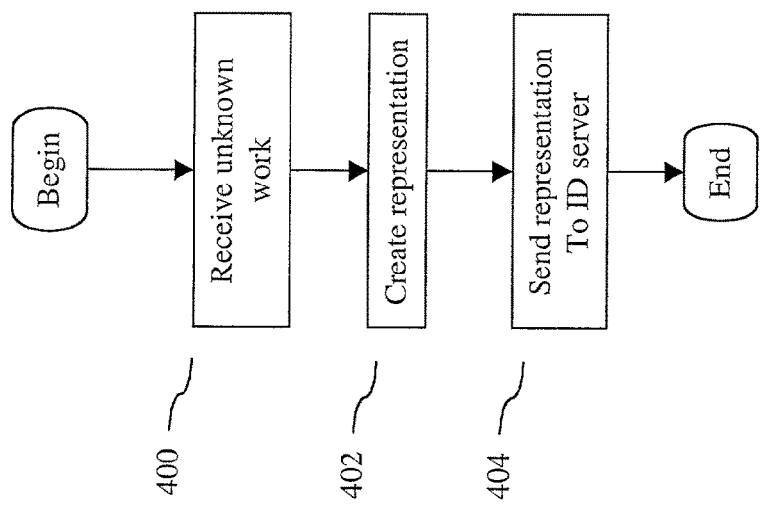
FIG. 4 is a flowchart of one aspect of a disclosed system.

FIG. 4 is a flowchart of one aspect of a disclosed method for automatically generating a playlist. The process begins in act 400, where at least one unknown is received by an analysis module. The analysis module may comprise hardware and software substantially as shown and described above.

Additionally, one or more of the analysis modules may be configured to receive a plurality of streaming sources simultaneously for analysis. It is contemplated that the analysis modules may be located and configured to receive and analyze a wide variety of content, including analog radio or video, digital streaming audio or video, or any other media.

In act 402, the analysis module then creates a representation of the received unknown work as shown and described above. The representation may be created by the analysis module by extracting psychoacoustic properties from the received unknown work as described above.

In act 404, the representations created by the one or more analysis modules may be provided to an ID server. The ID server may comprise hardware and software as described above. It is contemplated that the ID server may comprise a single server, multiple servers networked at a single location, or multiple servers located at different locations.

It is contemplated that the various analysis modules may provide representations to one or more ID servers in a wide variety of manners. For example, all of the analysis modules present in a system may provide representations in real-time. Or, different analysis modules may be configured to provide representations at different intervals depending on the needs of the end user. The analysis modules may transmit representations every sixty seconds, hourly, or as often as is needed.

In some cases where network connectivity is challenging, the representations may be batched up and sent to the ID server(s) once a day or less. In particularly harsh or secretive conditions, the representations may be stored within the analysis modules until the modules could be physically retrieved and operatively coupled to an ID server at another physical location.

It is contemplated that an out-of-band event may be used to trigger the transmission of representations. For example, such a trigger may comprise the initialization of a connection to a network, or the activation of media playing software or hardware.

Figure 5:
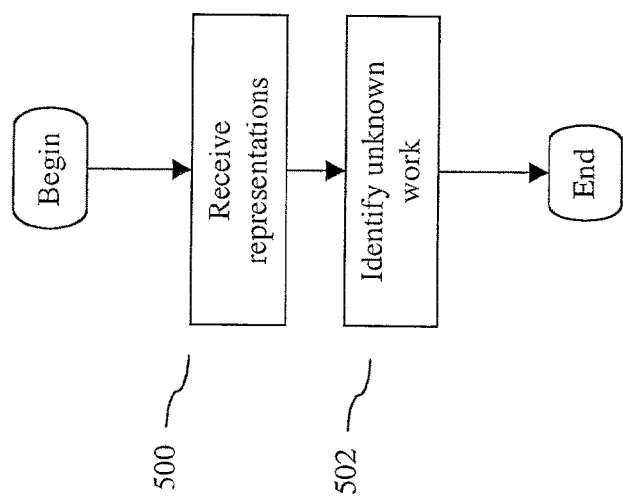
FIG. 5 is a flowchart of one aspect of a disclosed system.

FIG. 5 is a flowchart of a further disclosed aspect of a disclosed method. The process begins with act 500, where an ID server receives at least one representation of an unknown work. The representations may be received from analysis modules as described above.

In act 502, the ID server identifies the unknown work based upon the representation. This identification may be performed using the methods as described above. The identification may include such information as the song title, artist, label, or any other information as is known in the art that may be associated with the work. The identification information might contain information such as the name of the advertiser or a descriptive notation of an FCC broadcaster identification segment.

Once an identification of the unknown work is made, it is contemplated that a wide variety of further acts maybe performed. For example, the identifications made by the ID server may be used to construct or maintain a 15 play list database. Such a playlist may be stored on the ID server, or on a distant server. As will be appreciated by those skilled in the art, if representations are provided to the ID server in real-time (or near real-time depending on the equipment or network used), a play list may be generated in corresponding realtime. Thus, a playlist may be generated in real-time from inputs provided from distant geographic locations or multiple sources that contains a comprehensive play list of every identified media segment.

Additionally, the identification may be transmitted back to the analysis module which generated the representation. This may be advantageous where it is desired to generate a playlist for the particular analysis module's location or user. Thus, the ID server may be configured to provide an identification back to the source analysis module.

The identity of the received work may also be used for the maintenance of the system. Typically, copies of received works are stored on local drives for audit purposes. Since the intermediate representation files may be larger in size than the identities, it may be desirable to configure the analysis module to purge intermediate files for identified works to recover drive space. It is contemplated that the ID server may be configured to transmit the identity of received works back to the generating analysis module, and the corresponding representation files may then be deleted from local drives by the analysis module, thereby recovering valuable capacity.

Furthermore, it is contemplated that the ID server or analysis module may be configured to send information regarding identified works to third parties, such as third-party servers. Additionally, the ID server or analysis module may be configured to provide an electronic notification to third parties of identifications made by the ID server. Examples of electronic notifications may include email, HTTP POST transactions, or other electronic communication as is known in the art. As is known by those skilled in the art, these electronic notifications may be used to initiate an action based on their content. For example, such notifications may allow the playlist to be accessed in real-time or as desired.

It is contemplated that the ID server may be configured to provide customized playlists containing information tailored to a customer's individual needs. For example, a customer may wish to be notified whenever a certain work is broadcast, or whether a particular work is broadcast on a particular media outlet. Customers may wish to have complete play lists provided to them periodically at desired intervals that may include statistics known in the art. By using the system as disclosed herein, such requests may be satisfied automatically in real-time, or at whatever interval may be desired. It is to be understood that any of the aspects of the present disclosure may be performed in real time or as often as desired.

In some embodiments of this invention the received data may be divided into segments. For purposes of this discussion a segment is an arbitrary portion of the data of the unknown work of a predetermined length. It is contemplated that the ID server may examine the representations of all segments that were not identified in the process described above, and determine that some sub-segments were actually performances of a single work. Furthermore, this examination may extract a plurality of other characteristics of the original broadcast such as the amount of musical content, amount of speech content, a transcription based on speech recognition, the beat of any music present, etc. These characteristics of the un-identified segments can then be used to classify the un-identified unknown representations. For instance, a sub-segment that has been performed many times may be correlated with a high amount of musical content and a certain minimum length of play time to indicate that a new song has been detected. Correlating other values and characteristics could indicate that a new advertisement has been detected. In some cases a corresponding segment of the original broadcast signal could be retrieved and played for a human to perform an identification.

While embodiments and applications have been shown and described/it would be apparent to those skilled in the art that many more modifications and improvements than mentioned above are possible without departing from the inventive concepts herein. The disclosure, therefore, is not to be restricted except in the spirit of the appended claims.

What is claimed is:

1. A method comprising:
receiving, by a processor, a plurality of segment representations generated from a plurality of segments of a portion of audio data of a broadcast signal over a network, wherein the portion of audio data comprises a plurality of unknown works, and wherein the plurality of segments comprise portions of the plurality of unknown works;
identifying, by the processor, the plurality of unknown works based on identifying one or more segment representations of the plurality of segment representations that correspond to one or more segments of a plurality of reference works;
in view of the identifying, generating, by the processor, separate lists each representing a different identified work and not any other work, wherein the separate lists comprise a first list for a first identified work and a second list for a second identified work, the first list identifying broadcast instances of only the first identified work and the second list identifying broadcast instances of only the second identified work;
in view of the identifying, updating, by the processor, the first list by adding one or more first broadcast instances of the first identified work to the first list, wherein each of the one or more first broadcast instances represents when the first identified work was broadcast via the broadcast signal over the network; and
in view of the identifying, updating the second list by adding one or more second broadcast instances of the second identified work to the second list, wherein each of the one or more second broadcast instances represents when the second identified work was broadcast via the broadcast signal over the network, and wherein the second broadcast instances are different from the first broadcast instances;
outputting identification of the one or more segment representations that correspond to the one or more segments of the plurality of reference works responsive to identifying the one or more segment representations that correspond to the one or more segments of the plurality of reference works to enable a remote device to purge the one or more segment representations that correspond to the one or more segments of the plurality of reference works.

2. The method of claim 1, wherein the plurality of segment representations comprise at least one of feature vectors, spectral representations, text output of a speech recognition system, a musical score output of a music transcription system, or bit calculated keys.

3. The method of claim 1, wherein the plurality of segment representations are received as a batch at a predetermined time interval.

4. The method of claim 1, wherein updating the first list comprises updating the first list with the identification of the one or more segment representations that correspond to the one or more segments of the plurality of reference works responsive to identifying a first broadcast instance of the first identified work.

5. The method of claim 1, wherein the portion of audio data comprises unknown portions of the plurality of unknown works with unknown boundaries between the plurality of unknown works.

6. The method of claim 1, wherein the plurality of segment representations are received from a plurality of remote devices.

7. The method of claim 1, wherein the plurality of segment representations are received and the first list and the second list are updated in near real-time.

8. The method of claim 1, wherein the plurality of segment representations are received and the first list and the second list are updated in real-time.

9. The method of claim 1, wherein the plurality of segment representations are received from one or more remote devices, the method further comprising:
transmitting information regarding the identified works to a third party server.

10. A system comprising:
a first computing device comprising a memory, a processor coupled to the memory, and an identification server executed from the memory by the processor to:
receive a plurality of segment representations generated from a plurality of segments of a portion of audio data of a broadcast signal over a network, wherein the portion of audio data comprises a plurality of unknown works, and wherein the plurality of segments comprise portions of the plurality of unknown works;
identify the plurality of unknown works based on identifying one or more segment representations of the plurality of segment representations that correspond to one or more segments of a plurality of reference works;
in view of the identifying, generate separate lists each representing a different identified work and not any other work, wherein the separate lists comprise a first list for a first identified work and a second list for a second identified work, the first list identifying broadcast instances of only the first identified work and the second list identifying broadcast instances of only the second identified work;

in view of the identifying, update the first list by adding one or more first broadcast instances of the first identified work to the first list, wherein each of the one or more first broadcast instances represents when the first identified work was broadcast via the broadcast signal over the network;

in view of identifying, update the second list by adding one or more second broadcast instances of the second identified work to the second list, wherein each of the one or more second broadcast instances represents when the second identified work was broadcast via the broadcast signal over the network, and wherein the second broadcast instances are different from the first broadcast instances;

output identification of the one or more segment representations that correspond to the one or more segments of the plurality of reference works responsive to identifying the one or more segment representations that correspond to the one or more segments of the plurality of reference works to enable a remote device to purge the one or more segment representations that correspond to the one or more segments of the plurality of reference works.

11. The system of claim 10, wherein the plurality of segment representations comprise at least one of feature vectors, spectral representations, text output of a speech recognition system, a musical score output of a music transcription system, or bit calculated keys.

12. The system of claim 10, wherein the portion of audio data comprises unknown portions of the plurality of unknown works with unknown boundaries between the plurality of unknown works.

13. The system of claim 10, further comprising
a second computing device, networked to the first computing device, the second computing device to:
receive the portion of audio data of a broadcast signal;
generate the plurality of segment representations from the portion of audio data; and
transmit the plurality of segment representations over the network to the first computing device.

14. A non-transitory computer readable medium comprising instructions that, when executed by a processor, cause the processor to perform operations comprising:
receiving, by the processor, a plurality of segment representations generated from a plurality of segments of a portion of audio data of a broadcast signal over a network, wherein the portion of audio data comprises a plurality of unknown works, and wherein the plurality of segments comprise portions of the plurality of unknown works;

identifying, by the processor, the plurality of unknown works based on identifying one or more segment representations of the plurality of segment representations that correspond to one or more segments of a plurality of reference works;

in view of the identifying, generating, by the processor, separate lists each representing a different identified work and not any other work, wherein the separate lists comprise a first list for a first identified work and a second list for a second identified work, the first list identifying broadcast instances of only the first identified work and the second list identifying broadcast instances of only the second identified work;

in view of the identifying, updating, by the processor, the first list by adding one or more first broadcast instances of the first identified work to the first list, wherein each of the one or more first broadcast instances represents when the first identified work was broadcast via the broadcast signal over the network;

in view of identifying, updating the second list by adding one or more second broadcast instances of the second identified work to the second list, wherein each of the one or more second broadcast instances represents when the second identified work was broadcast via the broadcast signal over the network, and wherein the second broadcast instances are different from the first broadcast instances; and outputting identification of the one or more segment representations that correspond to the one or more segments of the plurality of reference works responsive to identifying the one or more segment representations that correspond to the one or more segments of the plurality of reference works to enable a remote device to purge the one or more segment representations that correspond to the one or more segments of the plurality of reference works.

15. The non-transitory computer readable medium of claim 14, wherein the plurality of segment representations comprise at least one of feature vectors, spectral representations, text output of a speech recognition system, a musical score output of a music transcription system, or bit calculated keys.

16. The non-transitory computer readable medium of claim 14, wherein the portion of audio data comprises unknown portions of the plurality of unknown works with unknown boundaries between the plurality of unknown works.

17. The non-transitory computer readable medium of claim 14, wherein the plurality of segment representations are received from a plurality of remote devices in near-real time, and wherein the first list and the second list are updated in near real-time.

* * * * *